United States Patent
Nicholson (10) Patent No.: US 10,438,222 B2
(45) Date of Patent: Oct. 8, 2019

(54) SYSTEM AND METHOD FOR INFLUENCING CUSTOMER BEHAVIOR

(71) Applicant: R. Randy Nicholson, Abilene, TX (US)

(72) Inventor: R. Randy Nicholson, Abilene, TX (US)

(73) Assignee: Excentus Corporation, Dallas, TX (US)

( * ) Notice: Subject to any disclaimer, the term of this patent is extended or adjusted under 35 U.S.C. 154(b) by 0 days.

(21) Appl. No.: 13/957,181

(22) Filed: Aug. 1, 2013

(65) Prior Publication Data

US 2013/0317897 A1 Nov. 28, 2013

Related U.S. Application Data (63) Continuation of application No. 13/563,354, filed on Jul. 31, 2012, now abandoned, which is a (Continued)

(51) Int. Cl.
G06Q 30/02 (2012.01)
G06Q 20/18 (2012.01)
(Continued)

(52) U.S. Cl.
CPC ......... *G06Q 30/0222* (2013.01); *G06Q 20/18* (2013.01); *G06Q 20/20* (2013.01);
(Continued)

(58) Field of Classification Search
CPC ....................................... G06Q 30/0207–0277
See application file for complete search history.

(56) References Cited

U.S. PATENT DOCUMENTS 3,852,576 A   12/1974 Rudd
3,931,497 A   1/1976 Gentile et al.
(Continued)

FOREIGN PATENT DOCUMENTS

CA   1234632   3/1988
EP   0 356 243   2/1990
(Continued)

OTHER PUBLICATIONS

U.S. Appl. No. 60/184,185.
(Continued)

*Primary Examiner* — David J Stoltenberg
(74) *Attorney, Agent, or Firm* — Norton Rose Fulbright US LLP (57) ABSTRACT

A computer-implemented system and method of influencing customer behavior. The customer is offered a price-per-unit (PPU) discount for fuel as a reward for performing a predefined action. A point-of-sale (POS) system at a merchant determines that the customer performed the predefined action, and stores the PPU discount and a customer identifier in a Discounts-Earned database. When the customer initiates a subsequent purchase of fuel, at the merchant or a different retail fueling merchant, a fuel dispenser controller retrieves the PPU discount from the database, discounts the posted price of the fuel by the PPU discount, and causes the dispenser to dispense fuel to the customer at the reduced price. A redeemed discounts calculator multiplies the PPU discount by the number of units purchased in the fueling transaction, and a clearing mechanism allocates the redeemed discount between the merchant and the retail fueling merchant.

7 Claims, 4 Drawing Sheets

Related U.S. Application Data continuation of application No. 11/254,624, filed on Oct. 20, 2005, now abandoned, which is a continuation-in-part of application No. 11/225,693, filed on Sep. 13, 2005, now abandoned, which is a continuation-in-part of application No. 11/158,674, filed on Jun. 22, 2005, now Pat. No. 7,742,942.

(51) Int. Cl.
*G06Q 20/20* (2012.01)
*G06Q 20/24* (2012.01)
*G06Q 30/06* (2012.01)

(52) U.S. Cl.
CPC ............ *G06Q 20/24* (2013.01); *G06Q 30/02* (2013.01); *G06Q 30/0217* (2013.01); *G06Q 30/0234* (2013.01); *G06Q 30/0238* (2013.01); *G06Q 30/06* (2013.01)

(56) References Cited

U.S. PATENT DOCUMENTS

| | | |
|---|---|---|
| 4,723,212 A | 2/1988 | Mindrum et al. |
| 4,821,186 A | 4/1989 | Munakata et al. |
| 4,825,045 A | 4/1989 | Humble |
| 4,910,672 A | 3/1990 | Off et al. |
| 4,949,256 A | 8/1990 | Humble |
| 5,008,519 A | 4/1991 | Cunningham et al. |
| 5,025,372 A | 6/1991 | Burton et al. |
| 5,056,019 A | 10/1991 | Schultz et al. |
| 5,132,521 A | 7/1992 | Smith et al. |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,299,135 A | 3/1994 | Lieto et al. |
| 5,340,969 A | 8/1994 | Cox |
| 5,368,129 A | 11/1994 | Kohorn |
| 5,420,606 A | 5/1995 | Begum et al. |
| 5,466,919 A | 11/1995 | Hovakimian |
| 5,481,094 A | 1/1996 | Suda et al. |
| 5,483,049 A | 1/1996 | Schulze, Jr. |
| 5,502,636 A | 3/1996 | Clarke |
| 5,612,868 A | 3/1997 | Off et al. |
| 5,689,100 A | 11/1997 | Carrithers et al. |
| 5,700,999 A | 12/1997 | Streicher et al. |
| 5,710,886 A | 1/1998 | Christensen et al. |
| 5,797,470 A | 8/1998 | Bohnert et al. |
| 5,806,045 A | 9/1998 | Biorge et al. |
| 5,822,735 A | 10/1998 | De Lapa et al. |
| 5,832,457 A | 11/1998 | O'Brien et al. |
| 5,862,222 A | 1/1999 | Gunnarsson |
| 5,895,457 A | 4/1999 | Kurowski et al. |
| 5,901,303 A | 5/1999 | Chew |
| 5,905,246 A | 5/1999 | Fajkowski |
| 5,923,016 A | 7/1999 | Fredregill et al. |
| 5,945,653 A * | 8/1999 | Walker .................. G06Q 20/341 235/375 |
| 6,000,608 A | 12/1999 | Dorf |
| 6,032,136 A | 2/2000 | Brake, Jr. et al. |
| 6,032,138 A | 2/2000 | McFiggans et al. |
| 6,073,840 A | 6/2000 | Marion |
| 6,076,068 A | 6/2000 | DeLapa et al. |
| 6,089,284 A | 7/2000 | Kaehler et al. |
| 6,098,879 A | 8/2000 | Terranova |
| 6,112,981 A | 9/2000 | McCall |
| 6,152,591 A | 11/2000 | McCall et al. |
| 6,189,787 B1 | 2/2001 | Dorf |
| 6,193,154 B1 | 2/2001 | Phillips et al. |
| 6,243,688 B1 | 6/2001 | Kalina |
| 6,263,319 B1 | 7/2001 | Leatherman |
| 6,292,786 B1 | 9/2001 | Deaton et al. |
| 6,298,329 B1 | 10/2001 | Walker et al. |
| 6,321,984 B1 * | 11/2001 | McCall et al. ............. 235/381 |
| 6,332,126 B1 | 12/2001 | Peirce et al. |
| 6,332,128 B1 * | 12/2001 | Nicholson .................. 705/14.26 |
| 6,450,407 B1 | 9/2002 | Freeman et al. |
| 6,594,640 B1 | 7/2003 | Postrel |
| 6,741,968 B2 | 5/2004 | Jacoves et al. |
| 6,778,967 B1 | 8/2004 | Nicholson |
| 6,813,609 B2 | 11/2004 | Wilson |
| 6,865,547 B1 | 3/2005 | Brake, Jr. et al. |
| 6,885,996 B2 | 4/2005 | Nicholson |
| 6,947,898 B2 | 9/2005 | Postrel |
| 6,980,960 B2 | 12/2005 | Hajdukiewicz et al. |
| 6,999,943 B1 * | 2/2006 | Johnson ................. G06Q 20/10 705/35 |
| 7,054,830 B1 | 5/2006 | Eggleston et al. |
| 7,072,864 B2 | 7/2006 | Brake, Jr. et al. |
| 7,096,190 B2 | 8/2006 | Postrel |
| 7,263,507 B1 | 8/2007 | Brake, Jr. et al. |
| 7,268,668 B2 | 9/2007 | Beenau et al. |
| 7,392,224 B1 * | 6/2008 | Bauer ..................... G06Q 20/04 705/35 |
| 7,506,804 B2 | 3/2009 | Zajkowski et al. |
| 7,562,048 B1 | 7/2009 | Sunde et al. |
| 7,606,730 B2 | 10/2009 | Antonucci |
| 7,624,040 B2 | 11/2009 | Postrel |
| 7,624,041 B2 | 11/2009 | Postrel |
| 7,660,763 B1 | 2/2010 | Brake, Jr. et al. |
| 7,676,393 B2 | 3/2010 | Postrel |
| 7,680,687 B2 | 3/2010 | Postrel |
| 7,680,688 B2 | 3/2010 | Hessburg et al. |
| 7,686,218 B2 | 3/2010 | Hessburg et al. |
| 7,707,111 B2 | 4/2010 | Brake, Jr. et al. |
| 7,716,080 B2 | 5/2010 | Postrel |
| 7,742,943 B2 | 6/2010 | Postrel |
| 7,747,524 B2 | 6/2010 | Brown |
| 7,761,378 B2 | 7/2010 | Postrel |
| 7,765,124 B2 | 7/2010 | Postrel |
| 7,769,630 B2 | 8/2010 | Postrel |
| 7,801,799 B1 | 9/2010 | Brake, Jr. et al. |
| 7,828,206 B2 | 11/2010 | Hessburg et al. |
| 8,010,405 B1 | 8/2011 | Bortolin et al. |
| 8,073,736 B2 | 12/2011 | Blagg et al. |
| 8,195,507 B2 | 6/2012 | Postrel |
| 8,285,588 B2 | 10/2012 | Postrel |
| 8,306,851 B2 | 11/2012 | Wells et al. |
| 8,317,094 B2 | 11/2012 | Lehman |
| 8,423,402 B2 | 4/2013 | Postrel |
| 8,433,608 B2 | 4/2013 | Bortolin et al. |
| 8,447,650 B2 | 5/2013 | Postrel |
| 8,452,647 B2 | 5/2013 | Postrel |
| 8,452,651 B2 | 5/2013 | Postrel |
| 8,478,638 B2 | 7/2013 | Postrel |
| 8,478,640 B2 | 7/2013 | Postrel |
| 8,489,513 B2 | 7/2013 | Bishop et al. |
| 8,606,631 B2 | 12/2013 | Blagg |
| 8,612,290 B2 | 12/2013 | Postrel |
| 8,676,642 B1 | 3/2014 | Sheley |
| 8,682,791 B2 | 3/2014 | Bies et al. |
| 8,695,875 B1 | 4/2014 | Segura |
| 8,701,989 B2 | 4/2014 | Lehman |
| 8,725,564 B2 | 5/2014 | Postrel |
| 8,738,429 B2 | 5/2014 | Shepard |
| 8,775,241 B2 | 7/2014 | Bortolin et al. |
| 8,781,891 B2 | 7/2014 | Postrel |
| 8,783,561 B2 | 7/2014 | Wesley |
| 8,799,063 B2 | 8/2014 | Postrel |
| 8,799,065 B2 | 8/2014 | Reuthe et al. |
| 8,939,357 B1 | 1/2015 | Perry |
| 9,038,893 B2 | 5/2015 | Kirkham |
| 9,135,612 B1 | 9/2015 | Proctor, Jr. et al. |
| 9,224,154 B2 | 12/2015 | Wesley |
| 2001/0020198 A1 | 9/2001 | Wilson |
| 2001/0034651 A1 * | 10/2001 | Marks ..................... G06Q 30/02 705/14.23 |
| 2001/0049626 A1 * | 12/2001 | Nicholson ............ G06Q 20/342 705/14.23 |
| 2002/0046117 A1 | 4/2002 | Marion |
| 2002/0107738 A1 | 8/2002 | Beach et al. |
| 2002/0143616 A1 | 10/2002 | Hajdukiewicz et al. |
| 2002/0143619 A1 * | 10/2002 | Laurie ..................... G06Q 30/02 705/14.12 |

(56) References Cited

U.S. PATENT DOCUMENTS

| | | |
|---|---|---|
| 2002/0174012 A1 | 11/2002 | Litwin |
| 2003/0033154 A1 | 2/2003 | Hajdukiewicz et al. |
| 2003/0040964 A1 | 2/2003 | Lacek |
| 2003/0046096 A1* | 3/2003 | Shah ................ G06Q 30/02 705/1.1 |
| 2003/0106934 A1* | 6/2003 | McCall ............... B67D 7/14 235/375 |
| 2003/0130891 A1* | 7/2003 | Jacobs .............. G06Q 20/10 705/14.36 |
| 2004/0158493 A1* | 8/2004 | Nicholson ......... G06Q 20/387 705/14.25 |
| 2004/0220861 A1 | 11/2004 | Morciniec et al. |
| 2004/0243478 A1 | 12/2004 | Walker et al. |
| 2004/0249710 A1 | 12/2004 | Smith et al. |
| 2005/0004839 A1* | 1/2005 | Bakker ............... G06Q 20/10 705/14.25 |
| 2005/0021400 A1* | 1/2005 | Postrel ............. G06Q 20/105 705/14.24 |
| 2005/0131761 A1 | 6/2005 | Trika et al. |
| 2005/0149402 A1* | 7/2005 | Nicholson ............ G06Q 30/02 705/14.13 |
| 2005/0234776 A1* | 10/2005 | Jacoves ............. G06Q 20/387 705/14.38 |
| 2005/0234777 A1 | 10/2005 | Bird et al. |
| 2005/0240527 A1 | 10/2005 | Goldman |
| 2005/0251440 A1* | 11/2005 | Bednarek ......... G06Q 30/0201 705/7.32 |
| 2005/0267800 A1 | 12/2005 | Tietzen et al. |
| 2006/0053056 A1* | 3/2006 | Alspach-Goss ...... G06Q 20/10 705/14.17 |
| 2006/0085252 A1* | 4/2006 | Kersenbrock ........ G06Q 30/02 705/14.13 |
| 2006/0086787 A1 | 4/2006 | Roy et al. |
| 2006/0095318 A1* | 5/2006 | Ross et al. ................... 705/14 |
| 2006/0095328 A1 | 5/2006 | Ross et al. |
| 2006/0271431 A1* | 11/2006 | Wehr .................. G06Q 20/20 705/14.27 |
| 2006/0293947 A1 | 12/2006 | Nicholson |
| 2007/0106602 A1* | 5/2007 | Wolters ............... G06Q 20/02 705/39 |
| 2007/0152038 A1 | 7/2007 | Ciancio et al. |
| 2007/0174126 A1 | 7/2007 | McCall et al. |
| 2007/0219872 A1 | 9/2007 | Rolf |
| 2008/0071614 A1 | 3/2008 | Mebruer |
| 2008/0126208 A1 | 5/2008 | Nicholson et al. |
| 2008/0189183 A1 | 8/2008 | Nicholson |
| 2008/0208688 A1 | 8/2008 | Byerley et al. |
| 2008/0221984 A1 | 9/2008 | Abhyanker |
| 2008/0262928 A1 | 10/2008 | Michaelis |
| 2008/0270245 A1* | 10/2008 | Boukadoum ........ G06Q 20/105 705/17 |
| 2009/0030798 A1 | 1/2009 | Otto et al. |
| 2009/0094158 A1 | 4/2009 | Fein et al. |
| 2009/0132381 A1 | 5/2009 | Gangi |
| 2009/0248518 A1 | 10/2009 | Shigematsu |
| 2009/0307079 A1 | 12/2009 | Martin, Jr. |
| 2010/0017284 A1 | 1/2010 | Ross et al. |
| 2010/0094690 A1 | 4/2010 | Beal |
| 2010/0114683 A1 | 5/2010 | Wessels et al. |
| 2010/0153205 A1 | 6/2010 | Retter et al. |
| 2011/0071890 A1 | 3/2011 | Hart et al. |
| 2011/0087531 A1 | 4/2011 | Winters et al. |
| 2011/0208576 A1* | 8/2011 | Durgin ............... G06Q 30/02 705/14.38 |
| 2011/0231321 A1 | 9/2011 | Milne |
| 2011/0251880 A1 | 10/2011 | Butler et al. |
| 2011/0264527 A1* | 10/2011 | Fitzpatrick ......... G06Q 30/02 705/14.55 |
| 2012/0029992 A1 | 2/2012 | De Facendis |
| 2012/0197705 A1 | 8/2012 | Mesaros |
| 2013/0046605 A1 | 2/2013 | Baron et al. |
| 2013/0091001 A1 | 4/2013 | Jia et al. |
| 2013/0246138 A1 | 9/2013 | Johnson et al. |
| 2013/0248591 A1 | 9/2013 | Look et al. |
| 2013/0282468 A1 | 10/2013 | Michael |
| 2013/0317894 A1 | 11/2013 | Zhu et al. |
| 2014/0025518 A1 | 1/2014 | Look |
| 2015/0012347 A1 | 1/2015 | Nicholson |
| 2015/0287068 A1 | 10/2015 | Porco et al. |

FOREIGN PATENT DOCUMENTS

| | | |
|---|---|---|
| EP | 0 511 463 | 4/1992 |
| GB | 2274349 | 7/1994 |
| JP | 2217998 | 8/1990 |
| WO | WO-91/18373 | 11/1991 |
| WO | WO-92/14213 | 8/1992 |
| WO | WO-96/06415 | 2/1996 |

OTHER PUBLICATIONS

Burns, P. and Stanley, A. (Apr. 2002) Fraud Management in the Credit Card Industry, Discussion Paper, Federal Reserve Bank of Philadelphia: 16 pages.

Kiernan, John. Credit Card & Debit Card Fraud Statistics. Retrieved May 20, 2016 from http://www.cardhub.com/edu/credit-debit-card-fraud-statistics/.

"Esso Animates," Globe & Mail, Canada, Sep. 16, 1998, p. B31.

Lisa Gonderinger, "Grocery Adds Gas Pumps Albertson's Putting Minimarts in Supermarket Parking Lots", Arizona Republic, Oct. 29, 1998, p. D1.

Lisa Gonderinger, "Albertson's Puts Gas Pumps in Phoenix Supermarket's Parking Lot," KRTBN Knight-Ridder Tribune Business News (Arizona Republic), Oct. 29, 1998.

Hisey, "Storming the Store Card Gates". Jul. 1997, 4 pgs.

Jul. 8, 1997 Facsimile to Don Krone @ Dunigan Fuels from Anie Krause al Fleming regarding Fleming/CFG Petoleum Marketing Plan dated Jul. 2, 1007, 20 pages.

Affidavit of G. Randy Nicholson dated Dec. 18, 2008, 44 pages.

Shockey, Don, "Automated Pumps New Krown Jewel," The Sunday Oklahoman, Feb. 26, 1989, 1 page.

U.S. Appl. No. 09/249,842.

U.S. Appl. No. 10/320,724.

U.S. Appl. No. 60/082,927, filed Apr. 24, 1998, Jacoves.

U.S. Appl. No. 60/093,813, filed Jul. 23, 1998, Nicholson.

Braykovich, Mark, "Want Gas? Biggs Sells That Too," The Cincinnati Enquirer, Oct. 4, 1989, 1 page.

Financial Marketing Consultants, Inc. presentation regarding Krown Systems, 4 pages.

Affidavit of Don Krone dated Apr. 27, 2006, 37 pages.

Fuel Incentives External Design Specification, Revision 2, Sep. 22, 2999, Catalina Marketing Corporation, 9 pages.

Grocery Fuel System Installation Manual, Convenient Fuel Group, Version .01, Aug. 1, 1998, 20 pages.

"CFG and Gilbarco," Gilbarco Press Release, Feb. 25, 1999, 2 pages.

"Profit Center 2000 The In-Store marketing program is the competitive advantage," CFG (Convenient Fuel Group), 8 pages.

Convenient Fuels Group System Operation Manual, Version .01, May 10, 1998, 18 pages.

USPTO Disclosure Document dated Apr. 27, 1998, 6 pages.

Krone, Donald et al., "Apparatus for Control and Reporting of Motor Fuel Sales," draft utility patent application, 15 pages.

Convenient Fuel Group video on DVD, date of file saved to DVD indicated as May 4, 2000 per metadata on disk.

Weaver, P., "Debit-card use growing fast," Nation's Business v. 83, No. 3, pp. 59, Mar. 1995, Dialog File 15, Record #00994494, 96-43884.

"Value in Action", Canadian Tire Corporation Limited 1992 Annual Report, 21 pages.

Patti Summerfield, "Canadian Tire Strategy", Brunico Communications, Inc., 10 pages, Mar. 8, 1993.

Patrick Allossery, "CanTire launches loyalty program", Brunico Communications, Inc., 1 page, Mar. 7, 1994.

(56) References Cited

OTHER PUBLICATIONS

Ian Wylie, "Tesco loyalty move fuels petrol price war; The forcourts battle has been stepped up by a supermarket", The Guardian Money Page, 2 pages, Mar. 16, 1996.
"Sainsbury's cuts the cost of motoring", Origin Universal News Services Limited, 1 page, Jan. 11, 1995.
Nick Pandya, "Sainsbury in card counter-attack", The Guardian City Page, 2 pages, Nov. 4, 1995.
Maurice Simms, "Report on data base marketing; Retailers pin hope on marketing skill; Loyalty programs/Zellers, Canadian Tire set standard for looming battle with Wal-mart". The Globe and Mail, 3 pages, Feb. 15, 1994.
Ian Morton, "ASDA HOTS up petrol war with voucher bonus", Associated Newspapers, Ltd. Evening Standard (London), 1 page, Feb. 24, 1995.
Kenneth Kidd, "Giant retailer hopes to buy 300 gas bars", Toronto Star Newspapers, Ltd., The Toronto Star, 3 pages, Feb. 17, 1989.
Debit-card use growing fast, by Weaver, Peter, Nations's Business, v83n3 pp. 59, Mar. 1995, Dailog file 15, Record #00994491. 96-43884.
Texas Cardholders Get Cash Discounts At Exxon Stations Around Country, American Banker Oct. 31, 1986 p. 12, DIALOG(R) File 160:Gale Group PROMT(R) Record #01494997.
Debit gets rewards by Paustian, Chuck, Credit Card Management v14n11 pp. 41 Jan. 2002 DIALOG(r) fILE 15: abi/iNFORM(r) #02296503 (1 Page).
The decision between debit and credit: finance charges, float, and fear. Financial Services Review, v 14, n1, p. 21 Mar. 2005 DIAOLOG(R)File 9:Business & Industry (R) record #04025835 (16 pages).
With Debit Push, B of A Goes Against the Grain, by Kingson, Jennifer A. American Banker, 169, 103 1 May 28, 2004 DIALOG(R) File 148: Gale Group Trade & Industry DB Reocrd #0017057437 (3 pages).
Debit Card Incentives: No Longer Just a Free Loaf of Bread, POS News, pN/A Jun. 1, 1992 (2 pages).
EDS' Instant Teller network joins Mobil debit card system, (Electronic Data Systems corp.) PR Newswire, 0723DE015 Jul. 23, 1990 DIALOG(R)File 148: Gale Group Trade & Industry DB Record # 04768283 (2 pages).
Francella, Barbara Grondin, "Anybody's Fuel," Convenience Store News, p. 31, Jul. 7, 1997, 9 pages.
Grocery-Gas Combo Opened by Nexus Fuel, 2,000 Planned in Five Years, The Food Institute Report, v70, n32, Aug. 11, 1997, 2 pages.
Callanan, John, "New Realities in Gasoline Marketing," Convenience Store News, p. 50, Dec. 15, 1997, 2 pages.
"Midland's Subsidiary, Arcon Energy, Inc. Sets Up a New Division," Business Wire, p. 04071444, Apr. 3, 1998, 2 pages.
Womack, Phil, "Regulations Changing Fuel Management Options," Baton Rouge Business Report, v10, n12, p. 21(3), Jan. 28, 1992,3 pages.
Roberts, Ginger, "US-Tower Records Launches Cross Promotion," Billboard (BBD), Search Report, p. 44, Feb. 20, 1993, 1 page.
Roberts, Ginger, "Sony and Coca-Cola in Cross-Promo Link-up," Billboard (BBD), Search Report, p. 4, 79, Mar. 16, 1991, 1 page.
Jackson, Estelle, "Area Oil Firms Offer Plans for Guaranteed Prices," Richmond Times-Dispatch, City Section: Business, p. E-1, Jul. 14, 1991, 3 pages.
Ivanovich, David, "Exxon-GE MasterCard to Feature Rebates on Gasoline," Houston Chronicle: Sep. 15, 1994, 1 pg.
Unpublished U.S. Appl. No. 12/832,788 to Perry et al., filed Jul. 8, 2010 and entitled "Systems and Methods for Redeeming E-Coupons."
Gulfree Miles: abstract and search history for the article "Gulf Oil: Pumping up Sales," Incentive Managing and Marketing Through Motivation, v 164, n4, p. 115-116, Apr. 1990.

* cited by examiner

SYSTEM AND METHOD FOR INFLUENCING CUSTOMER BEHAVIOR

RELATED APPLICATIONS

This application is a continuation of co-pending U.S. patent application Ser. No. 13/563,354 filed Jul. 31, 2012, which is a continuation of co-pending U.S. patent application Ser. No. 11/254,624 filed Oct. 20, 2005, which is a continuation-in-part of co-pending U.S. patent application Ser. No. 11/225,693 filed Sep. 13, 2005, which is a continuation-in-part of co-pending U.S. patent application Ser. No. 11/158,674 filed Jun. 22, 2005, the disclosures of which are incorporated herein by reference.

BACKGROUND OF THE INVENTION

This invention relates to automated retail systems and methods. More particularly, and not by way of limitation, the invention is directed to a system and method for influencing customer behavior by providing an incentive to the customer in the form of a price-per-unit (PPU) discount on fuel as a reward for demonstrating the desired behavior.

As used herein, the term "vendor" refers to the manufacturer of a specific product or the supplier of specific services. The term "merchant" refers to the store where the products are purchased, such as grocery stores, convenience stores, gasoline service stations, unattended fueling stations, and the like. A point-of-sale (POS) terminal may be a terminal inside the store, or may be an island-card-reader (ICR) implemented within a fuel dispenser.

Financial card authorization networks charge merchants a fee for processing credit and debit card transactions. The network fee for processing credit card transactions is higher than the fee for processing debit card transactions. Therefore, from the merchant's perspective, it is desirable to encourage customers to use debit cards rather than credit cards. Additionally, many cards are dual-mode" cards, which can be used as either a debit or a credit card. Merchants also find it desirable to encourage customers to use their dual-mode cards as debit cards rather than credit cards.

To achieve this objective, the POS system must be able to identify a card as being a credit-only card, a debit-only card, or a dual-mode card when it is swiped at the payment terminal. Currently, many POS systems make this identification by requesting the customer to select either Credit or Debit when beginning the transaction. This approach, however, may result in the customer selecting a mode of payment that is not valid for the particular card. If the customer makes an invalid selection, an additional transaction fee may be incurred. In any event, there is no incentive for the customer to select Debit instead of Credit.

Some financial card authorization networks maintain a Bank Identification Number (BIN) File that contains card information that provides additional insight into whether the cards in a particular range of cards are credit-only, debit-only, or dual-mode cards. However, there are several problems with using the BIN File. First, the BIN File is extremely large and cannot be sent directly to the POS terminal. Instead, the network host computer generally sends the BIN File to the merchant's host computer periodically (for example, once a week). When a transaction is initiated and the customer selects Debit or Credit, the merchant's POS system dials out to the merchant's host and retrieves the information from the BIN File for the card swiped by the customer. A second problem is that the BIN File is not always accurate. One reason for this is that the BIN File is generally a best guess approximation by the network host based on actual transactions processed over time. Another reason is that card issuers do not cooperate (for competitive reasons) to provide BIN range information to each other, so the information is often incomplete. Card issuers may also be reluctant to share this information because they do not necessarily want the customer to choose debit because this reduces their transaction fee revenue. In any event, once again, there is no incentive for the customer to select Debit instead of Credit.

The issuers of credit and debit cards also have programs to encourage consumers to utilize the issuers' cards when making purchases. Conventionally, these programs have consisted of giveaways of promotional merchandise, low interest rates on unpaid balances and balance transfers from other cards, and cash back at the end of the year (usually 1-2 percent) on purchases made throughout the year. Some manufacturers such as automobile manufacturers have established affinity-type relationships with card issuers to issue credit cards with a manufacturer's logo on the face of the card. Use of such cards results in cash back awards good only on purchases of the associated manufacturers' products. Similarly, some merchants have established affinity-type relationships with card issuers to issue credit cards with a merchant's logo on the face of the card. Use of such cards results in cash back awards good only on purchases within the associated merchant's stores. The manufacturers' programs and the merchants' programs are generally less effective than conventional cash back programs because of the limitations placed on use of the cash back award.

With existing affinity-type relationships, the reward does not occur at the time or point of purchase. Instead, the reward is posted to the customer's credit card account and appears on the customer's monthly account statement. The reward may appear as a monetary credit, or may appear as points, which the customer can redeem when the cumulative total surpasses defined threshold levels. Thus, the reward is not immediate, and the customer must take additional steps to redeem the reward.

Many merchants are also implementing systems to increase the security of financial transactions occurring in their stores. For example, increased security is provided by registering biometric information for customers and checking this information against a current customer's information to verify the identity of the customer. Many customers, however, are reluctant to provide such information or do not want to take the time to provide the information.

Merchants such as grocery stores, convenience stores, and gasoline service stations generally sell goods inside the store in addition to selling fuel. These merchants generally realize a higher profit percentage on inside sales than they do on fuel. Therefore, it is desirable from the merchant's perspective to provide an incentive for customers who purchase fuel to also come into the store and purchase goods inside.

What is needed in the art is a system and method that overcomes the disadvantages of existing systems and methods by providing a customer with an incentive to demonstrate certain desirable behaviors. The present invention provides such a system and method.

SUMMARY OF THE INVENTION

In one aspect, the present invention is a computer-implemented method of influencing customer behavior. The method includes offering the customer a price-per-unit (PPU) discount for fuel as a reward for performing a predefined action; determining that the customer performed the predefined action; and awarding the PPU discount for fuel to the customer. The predefined action may be any action that is rewarded with a PPU discount for fuel. For example, the predefined action may include performing a debit-type financial transaction rather than a credit-type transaction at a merchant; purchasing at least one product or service at a merchant utilizing a prepaid cash card; purchasing at least one product or service at a merchant utilizing a credit card that is subject to an affinity-type agreement between the merchant and an issuer of the credit card; purchasing more than a threshold amount of products or services at a merchant; purchasing more than a threshold amount of fuel, purchasing at least one in-store product or service at a merchant who also sells fuel; participating in a customer survey; or participating in a program to enhance security of financial transactions.

In another aspect, the present invention is a system for influencing a customer to perform a desired action by awarding the customer a PPU discount for fuel as a reward for performing the desired action. The system includes means for determining that the customer performed the desired action; and computer-implemented means for awarding the PPU discount for fuel to the customer. The means for determining that the customer performed the desired action may be a point-of-sale (POS) system at a merchant, and the computer-implemented means for awarding the PPU discount may be a fuel dispenser controller for dispensing fuel to the customer in a subsequent fueling transaction. The dispenser controller has access to the customer's PPU discount and reduces a posted price for the fuel by an amount equal to the PPU discount.

BRIEF DESCRIPTION OF THE DRAWINGS

The invention will be better understood and its numerous objects and advantages will become more apparent to those skilled in the art by reference to the following drawings, in conjunction with the accompanying specification, in which.

The present invention provides an incentive to a consumer to select Debit as the mode of payment for a financial transaction by awarding the customer a price-per-unit (FPU) discount on fuel if the customer performs a debit-type transaction rather than a credit-type transaction. The invention also makes it easier for the customer to select Debit by eliminating one of the steps that the customer is currently required to perform. When the customer swipes a card, the POS system accesses the BIN File in the merchant's host computer and determines whether the card is a credit only, debit only, or dual-mode card. If the card is identified as being credit only, the transaction is automatically initiated as a credit-type transaction. If the card is identified as being debit only, the terminal displays the message "Enter PIN".

Thereafter, the transaction is completed as a debit-type transaction. If the card is identified as a dual-mode card, or if the mode of the card cannot be determined from the BIN File, the terminal displays the message "Enter PIN or Press Credit". This message eliminates the need for the preliminary message "Press Debit or Credit", followed by the additional message "Enter your PIN" if Debit was selected.

Figure 1:
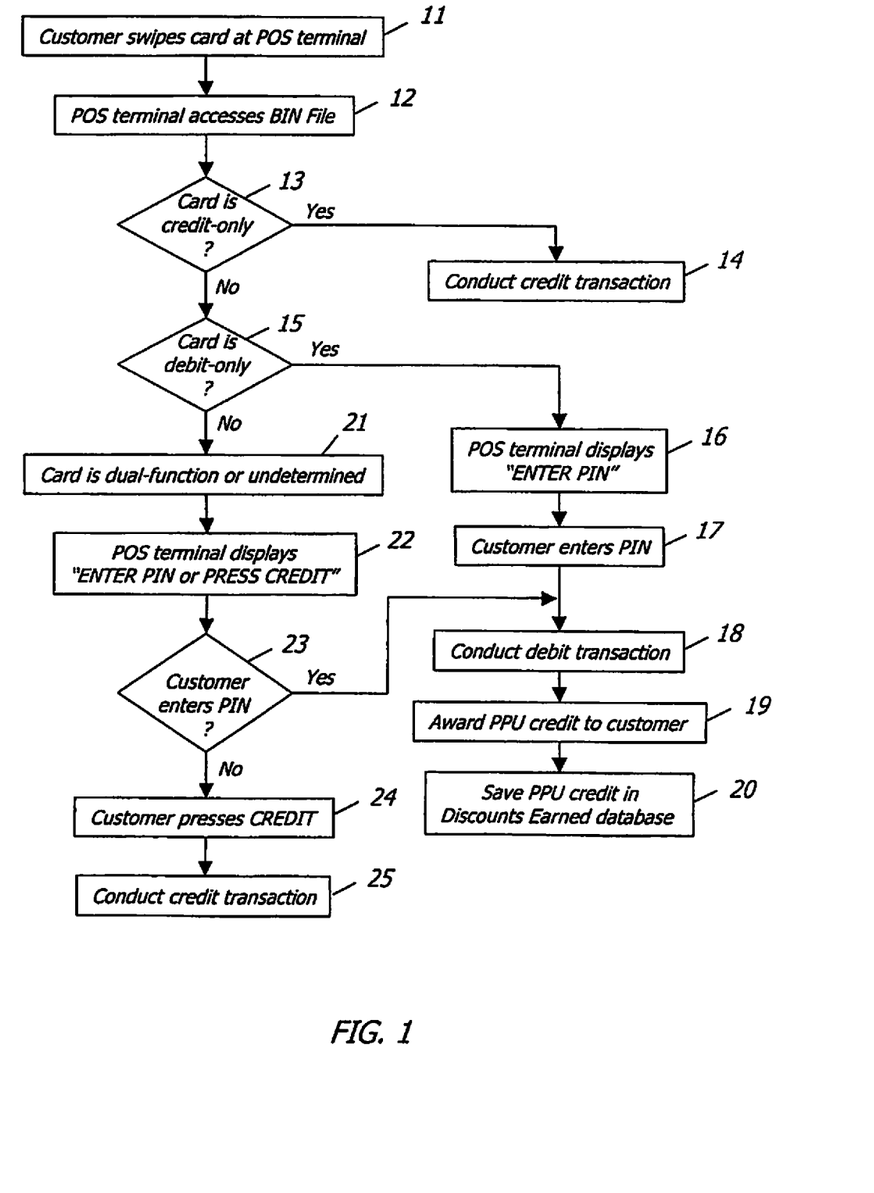
FIG. 1 is a flow chart illustrating the steps of an embodiment of a method of awarding a PPU discount for fuel in exchange for a customer's selection of a debit-type financial transaction.

FIG. 1 is a flow chart illustrating the steps of an embodiment of a method of awarding a PPU discount for fuel in exchange for a customer's selection of a debit-type financial transaction. At step 11, a customer swipes a financial card at a POS terminal. At step 12, the POS terminal access the BIN File either in a local database or at the merchant's host computer. At step 13, it is determined from the information in the BIN File whether the card is a credit-only card. If so, the method moves to step 14 and conducts a credit transaction. However, if the card is not a credit-only card, the method moves to step 15 where it is determined from the information in the BIN File whether the card is a debit-only card. If so, the method moves to step 16 where the POS terminal displays "Enter PIN". At step 17, the customer enters his/her PIN, and at step 18 a debit-type transaction is conducted.

As a reward for using a debit card, the customer is awarded a PPU discount on fuel at step 19. In one embodiment, the PPU discount is awarded each time the customer performs a debit-type transaction. In another embodiment, the PPU discount is awarded after one or more award criteria are met. For example, the customer may have to perform a predefined number of debit-type transactions, or may have to purchase a predefined threshold amount of goods or purchase a cross-marketed product in addition to performing the debit-type transaction(s). At step 20, the PPU discount is saved in a Discounts-Earned database.

If it is determined at step 15 that the card is not a debit-only card, and thus is not a credit-only card or a debit-only card, the method moves to step 21 where it is concluded that the card is either a dual-mode card or the payment mode of the card cannot be determined from the BIN File. The method then moves to step 22 where the POS terminal displays "Enter PIN or Press Credit". At step 23, it is determined whether the customer entered a PIN. If so, the method moves to step 18 and conducts a debit-type transaction. At steps 19 and 20, the customer is awarded the PPU discount and the discount is stored in the Discounts-Earned database. If the customer did not enter a PIN at step 23, the method moves to step 24 where the customer presses Credit. The method then moves to step 25 and conducts a credit transaction.

The present invention thus provides an incentive to the customer by offering a PPU discount on the purchase of fuel in exchange for the customer's selection of a debit-type transaction. The fuel may be sold by the merchant or by a retail fueling merchant who has a cross-marketing agreement in place with the merchant. The amount of the PPU discount may be a fixed amount such as ten cents per gallon, or may vary depending on other factors such as the number of times the customer selects Debit in a predefined time period, the amount of the financial transaction, whether a cross-marketed product was purchased, or the amount of fuel the customer purchases with the card at the retail fueling merchant. For example, the first five times the customer selects Debit each month at the merchant, the PPU discount may be ten cents per gallon. For the sixth through the tenth time the customer selects Debit at the merchant in the month, the PPU discount may be twenty cents per gallon, and so on. The value of redeemed discounts (i.e., the PPU discount provided to the customer multiplied by the number of gallons purchased) is then allocated between the merchant and the retail fueling merchant in accordance with the agreement between them.

In one embodiment of the present invention, the issuer of the financial card also enters an agreement with the merchant and the retail fueling merchant to provide an incentive for customers to use the issuer's card. This may be an affinity-type relationship in which a bank issues the card with an oil company logo on the face of the card. For example, Wells Fargo may issue a relationship card with an Exxon logo on its face. The incentive for customers to use the Wells Fargo relationship card is that the customer may earn an immediate discount on fuel at Exxon stations by using the relationship card at the merchant. The incentive to select a debit-type transaction at the merchant is that the customer only earns the discount if a debit-type transaction is selected. Note that the inventive affinity-type relationship provides an immediate discount at the point of purchase, while existing affinity-type relationships provide delayed credits on the customer's credit card statement at a later date, or points that the customer must redeem when an award level is reached.

Figure 2:
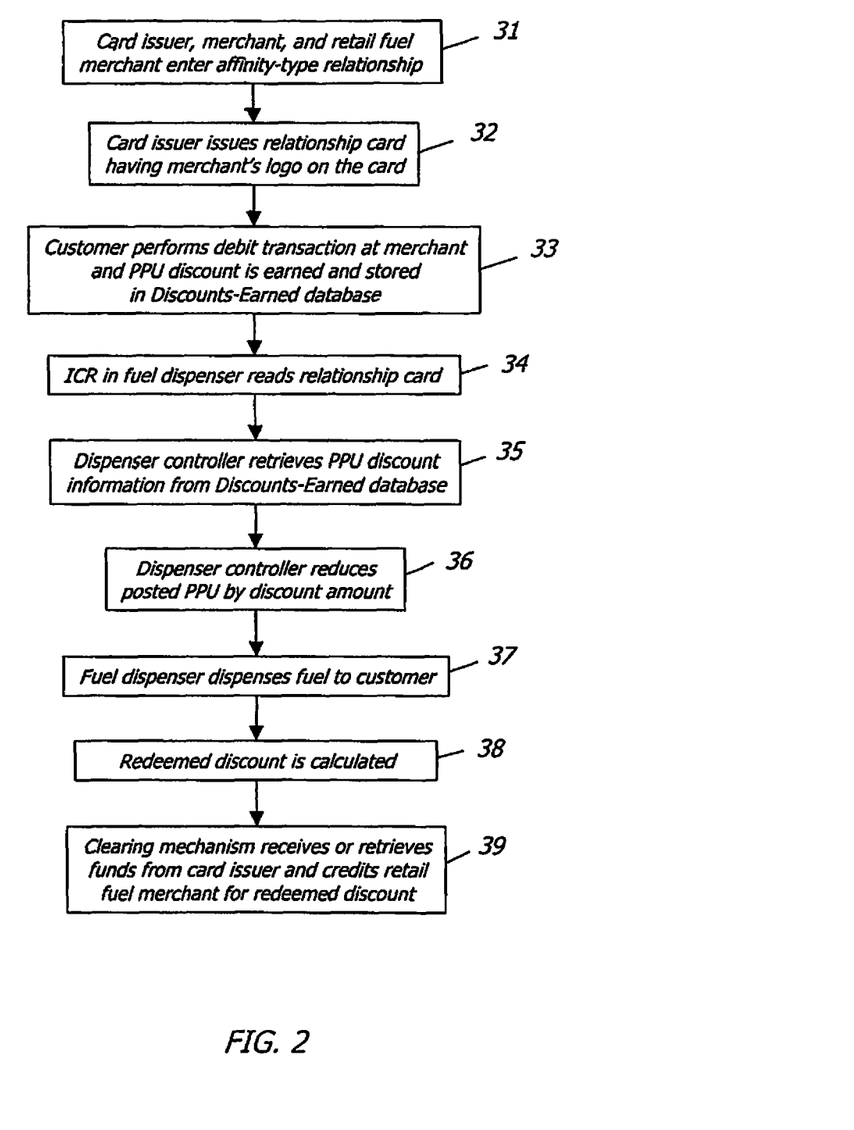
FIG. 2 is a flow chart illustrating the steps of an embodiment of a method of redeeming and clearing the PPU discount for fuel in accordance with the teachings of the present invention.

FIG. 2 is a flow chart illustrating the steps of an embodiment of a method of redeeming and clearing the PPU discount for fuel in accordance with the teachings of the present invention. In this embodiment, the card issuer, merchant, and retail fueling merchant have entered an affinity-type agreement at step 31, and the card issuer has issued a relationship card having the merchant's logo on the card at step 32. For purposes of the present invention, the card may be a debit-only card or a dual-mode card.

At step 33, when the customer uses the relationship card to conduct a debit-type transaction at the merchant, a PPU discount for fuel is earned and stored in the Discounts-Earned database. The customer subsequently uses the relationship card to purchase fuel at the participating retail fueling merchant, and the island card reader (ICR) in the fuel dispenser reads the relationship card at step 34. At step 35, the dispenser controller retrieves the PPU discount information from the Discounts-Earned database. At step 36, the dispenser controller immediately lowers the posted street price displayed on the dispenser by the amount of the PPU discount retrieved from the Discounts-Earned database. The PPU discount may be a fixed amount such as 10 cents per gallon, or may be a percentage discount, which fluctuates with the posted price of the fuel. For example, if the affinity-type agreement between the bank, the merchant, and the retail fueling merchant recites a five percent discount, and the posted street price of the fuel is $2.00 per gallon, the customer sees the price on the dispenser drop by 10 cents per gallon when the dispenser reads the card. If the posted price is $3.00 per gallon, the customer sees the price drop by 15 cents per gallon when the dispenser reads the card. At step 37, the fuel dispenser dispenses fuel to the customer at the reduced PPU. From the customer's perspective, the transaction is complete when the fuel purchase transaction is completed. No future events or actions on the part of the customer are required to utilize an earned reward.

At step 38, a redeemed discount is calculated. In the preferred embodiment, a dollar amount of the redeemed discount is calculated by multiplying the PPU discount by the number of units of fuel purchased in the transaction. At step 39, a clearing mechanism tracks the redeemed discounts, and performs settlement procedures by exchanging funds between the parties to the affinity-type agreement. For example, the clearing mechanism may receive or retrieve funds from the card issuer, and credit those funds to the retail fueling merchant. In this scenario, the retail fueling merchant always receives the posted street price for the fueling transaction. The card issuer funds the discounts from its credit card transaction fees. In another scenario, the merchant may also provide part of the funds to the retail fueling merchant. In this scenario, the merchant may fund its part of the discount from transaction fees that were saved as a result of the customer selecting a debit-type transaction instead of a credit transaction. In yet another scenario, a vendor of a cross-marketed product, which was one of the necessary criteria for awarding the discount, provides funds to cover all or part of the discount.

Figure 3:
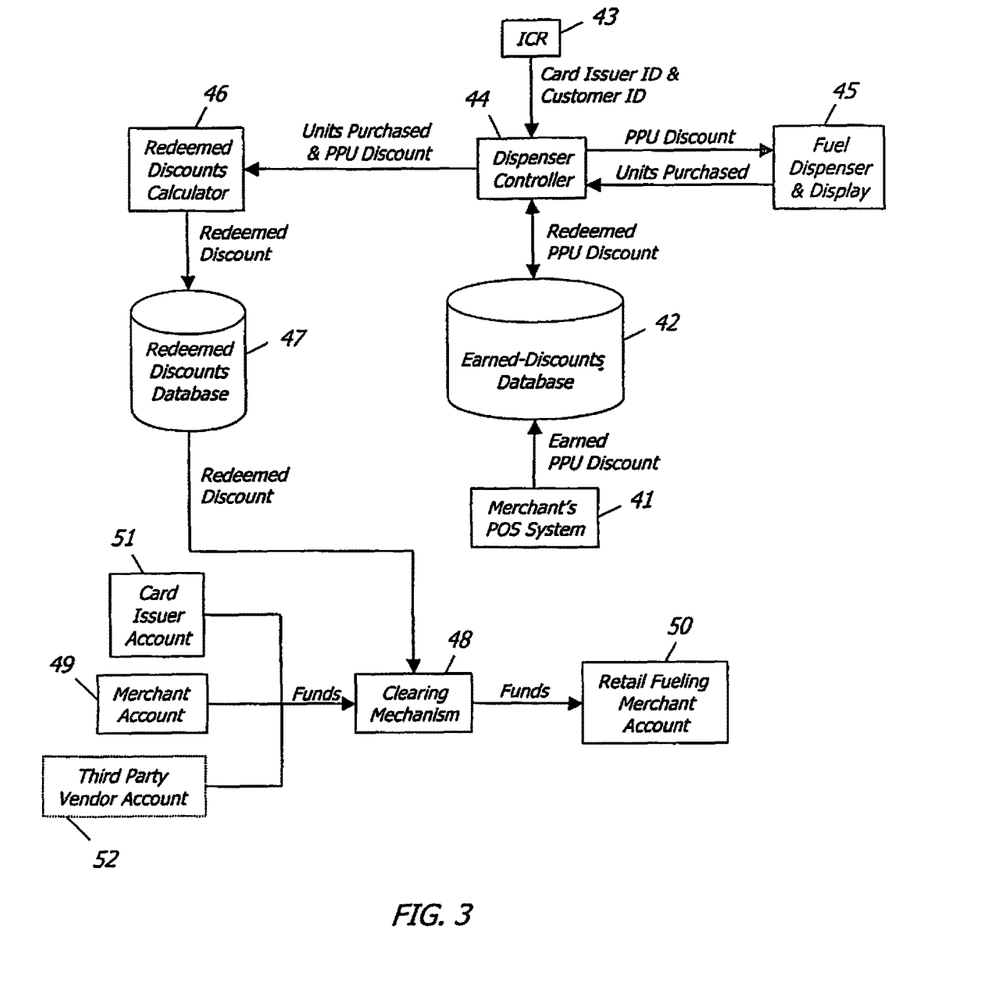
FIG. 3 is a simplified block diagram of an embodiment of the system of the present invention.

FIG. 3 is a simplified block diagram of an embodiment of the system of the present invention. When a customer performs a debit-type transaction at the merchant's POS system 41, a PPU discount is earned, and the earned PPU discount is stored in the Earned-Discounts database 42. As previously noted, the PPU discount may be earned solely for performing a debit-type transaction, or may also or alternatively require that other criteria be met, such as using a relationship card subject to an affinity-type agreement, purchasing more than a threshold amount of goods, or purchasing a cross-marketed product. As further described below, other actions by the customer, as defined by the merchant, may also earn a PPU discount. When the customer performs a desired action multiple times, or performs several different desired actions, the customer earns multiple PPU discounts. Each discount is sent to the Earned-Discounts database where the discounts are added together to achieve a total PPU discount.

Subsequently, when the customer uses the card to purchase fuel at the retail fueling merchant, the Island Card Reader (ICR) 43 in the fuel dispenser (or other input device) reads the magnetic strip on the relationship card. The card information may also be input by other technologies such as a radio frequency identification (RFID) controller with read/write capability, a contactless smart card reader, an audio recognition device, a biometric recognition device, an optical reader, and the like. The BIN range is utilized to identify the card issuer, and a card issuer ID and the customer ID are passed to a dispenser controller 44. Alternatively, the ICR may send the card number to the dispenser controller, and the controller may determine the identification of the card issuer and the customer. The dispenser controller uses the card issuer ID and/or customer ID to access the Earned-Discounts database 42 and retrieve an associated redeemed PPU discount. The controller then reduces the posted street price on the dispenser display by the amount of the associated PPU discount, and causes the fuel dispenser 45 to dispense the fuel at a discounted price.

When the customer indicates the transaction is complete (for example by replacing the fuel nozzle in its holder), the number of units of fuel purchased is determined by the dispenser controller 44, which then sends the number of units of fuel purchased and the PPU discount to a redeemed discounts calculator 46. The calculator may be incorporated into the dispenser controller, or may be implemented separately. The calculator preferably calculates the amount of the redeemed discount by multiplying the PPU discount by the number of units of fuel purchased in the transaction. The redeemed discount may then be stored in a redeemed discount database 47 where it is associated with the card issuer, the merchant, the retail fueling merchant, and optionally, a third party vendor if a cross-marketed product was involved.

A clearing mechanism 48 interfaces with the redeemed discount database, and retrieves the amount of the redeemed discount. The clearing mechanism then transfers funds for the amount of the redeemed discount between the parties of the agreement in accordance with the terms of the agreement. For example, funds may be drawn from the merchant's account 49 and provided to the retail fueling merchant's account 50 if the discount was awarded purely because the customer performed a debit-type transaction and/or purchased a threshold amount of goods from the merchant. If an affinity-type agreement was involved with the card issuer, the clearing mechanism may also or alternatively obtain funds from the card issuer's account 51 and provide the funds to the retail fueling merchant to cover the cost of the discount. Likewise, if a cross-marketing agreement was involved with a third party vendor, the clearing mechanism may also or alternatively obtain funds from the third-party vendor's account 52 and provide the funds to the retail fueling merchant to cover the cost of the discount.

Thus, the customer receives an immediate reward, the retail fueling merchant receives the posted street price for the fueling transaction, and the merchant, the card issuer, and the third party vendor fund the discount.

Figure 4:
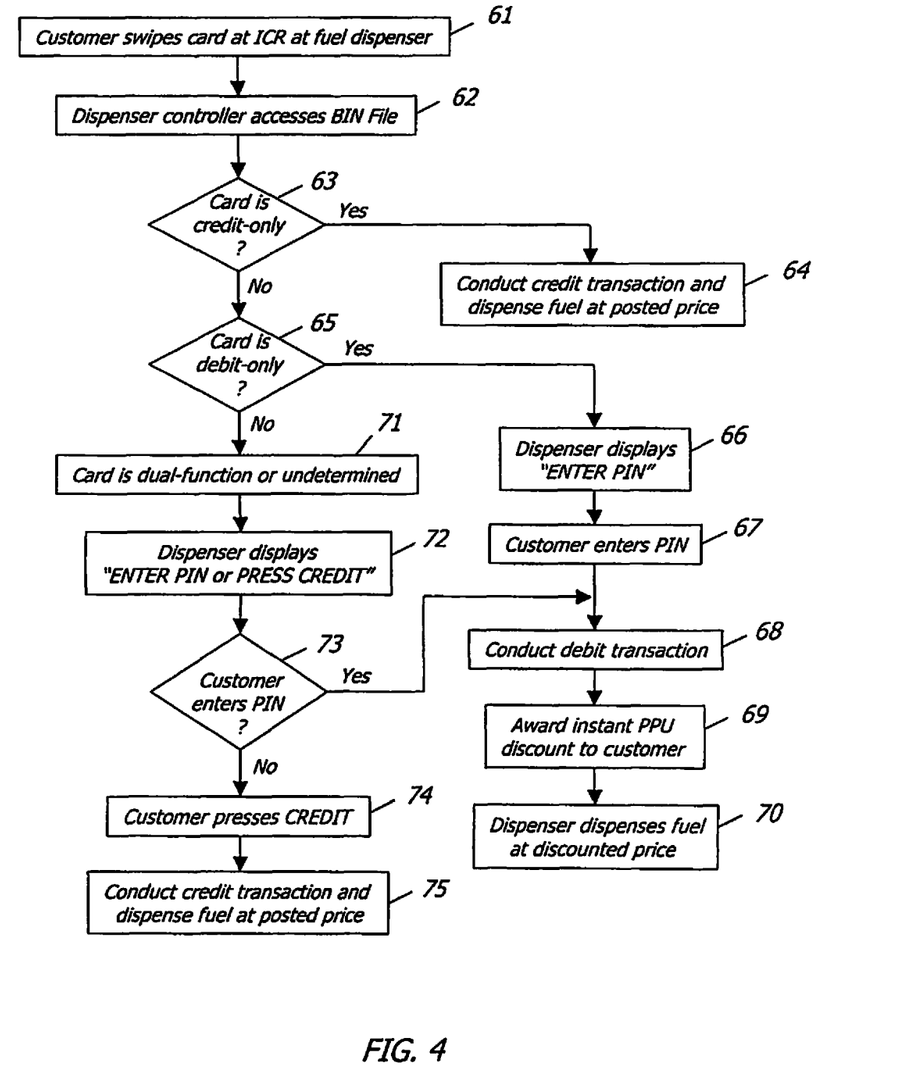
FIG. 4 is a flow chart illustrating the steps of another embodiment of a method of awarding a PPU discount for fuel in exchange for a customer's selection of a debit-type financial transaction.

FIG. 4 is a flow chart illustrating the steps of another embodiment of a method of awarding a PPU discount for fuel in exchange for a customer's selection of a debit-type financial transaction. In this embodiment, an instant PPU discount is provided when the customer chooses to perform a debit-type transaction when purchasing fuel at the retail fueling merchant. Since the discount is instant, an Earned-Discounts database is not required.

At step 61, a customer swipes a financial card at the ICR of a fuel dispenser at the retail fueling merchant. At step 62, the dispenser controller access the BIN File either in a local database or at the retail fueling merchant's host computer. At step 63, it is determined from the information in the BIN File whether the card is a credit-only card. If so, the method moves to step 64 and conducts a credit transaction, dispensing fuel to the customer at the posted price. However, if the card is not a credit-only card, the method moves to step 65 where it is determined from the information in the BIN File whether the card is a debit-only card. If so, the method moves to step 66 where the dispenser displays "Enter PIN". At step 67, the customer enters his/her PIN, and at step 68 a debit-type transaction is conducted.

As a reward for using a debit card, the customer is awarded an instant FPU discount at step 69. At step 70, the dispenser dispenses fuel to the customer at a price that is discounted from the posted price by the amount of the instant PRU discount.

If it is determined at step 65 that the card is not a debit-only card, and thus is not a credit-only card or a debit-only card, the method moves to step 71 where it is concluded that the card is either a dual-mode card or the payment mode of the card cannot be determined from the BIN File. The method then moves to step 72 where the dispenser displays "Enter PIN or Press Credit". At step 73, it is determined whether the customer entered a PIN. If so, the method moves to step 68 and conducts a debit-type transaction. At steps 69 and 70, the customer is awarded the instant PPU discount, and the dispenser dispenses fuel to the customer at the discounted price. If the customer did not enter a PIN at step 73, the method moves to step 74 where the customer presses Credit. The method then moves to step 75 and conducts a credit transaction, dispensing fuel to the customer at the posted price.

It will be easily appreciated by those skilled in the art that the above description providing an incentive to perform a debit-type transaction may also be applied to other types of desired customer behavior. For example, a PPU discount on fuel may be awarded if a customer uses a prepaid cash card, a gift card, or a credit card that is subject to an affinity-type agreement. The merchant may also encourage repeat business from fuel customers by providing a PPU discount on fuel as an award for purchasing a predefined threshold amount of fuel. The customer's fuel purchases are recorded in a database, and when the total amount purchased meets or exceeds the predefined threshold amount of fuel, a PPU discount is awarded.

Likewise, in order to encourage customers to come into the store and purchase additional products, certain in-store items may be cross-marketed so that a PPU discount on fuel is awarded in exchange for purchasing one or more cross-marketed products. Purchasing multiple cross-marketed products, or making a larger total purchase, may earn a larger PPU discount. As further incentive to purchase in-store products, the PPU discount for in-store purchases may be awarded at a higher percentage rate than for fuel purchases. For example, a customer may earn a 10-cents-per-gallon discount on his next fill up whenever he has purchased $50 worth of fuel. For in-store purchases, the customer may have to purchase only $20 worth of products to qualify for the same 10-cents-per-gallon discount.

The present invention may also be utilized to provide incentive for customers to perform other actions desired by the merchant. For example, a PPU discount may be awarded if the customer participates in a marketing survey or participates in a security program designed to reduce the number of fraudulent financial transactions. For example, a customer may be awarded a PPU discount in exchange for providing biometric information such as fingerprints or retinal scans so that the customer's identity can be verified during future financial transactions. Thus, the scope of the invention is intended to cover any desired action, as long as the action is encouraged by awarding a PPU discount on fuel.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A system for influencing consumer behavior to reduce financial card fraud during a fuel transaction, the system comprising:
  a fuel dispenser comprising:
  a display device configured to present information during fuel transactions conducted at the fuel dispenser;
  an island-card-reader (ICR) configured to read financial card information from financial cards during the fuel transactions conducted at the fuel dispenser;
  at least one biometric input device for capturing biometric information during the fuel transactions conducted at the fuel dispenser;
  a fuel nozzle; and
  a fuel pump controller configured to control operations of the fuel dispenser during the fuel transactions conducted at the fuel dispenser, wherein the fuel pump controller is communicatively coupled to the ICR, the at least one biometric input device, and the fuel nozzle, wherein the fuel nozzle is configured to dispense fuel from the fuel dispenser under the control of the fuel pump controller, wherein the fuel pump controller is configured to implement a first fuel rewards program and a second fuel rewards program and to control the operations of the fuel dispenser during a fuel transaction of a customer by:

receiving financial card information associated with the customer from the ICR;

determining whether to award an instantaneous price-per-unit (PPU) discount based on whether a first set of fuel rewards program criteria associated with the first fuel rewards program is satisfied and based on whether a second set of fuel rewards program criteria associated with the second fuel rewards program is satisfied, wherein determining whether the first set of fuel rewards program criteria is satisfied includes:

determining whether biometric information of the customer has been received via the at least one biometric input device;

determining whether the customer has previously registered biometric information;

in response to a determination that the customer has previously registered biometric information, comparing the biometric information received from the at least one biometric input device to the registered biometric information to identify the customer, wherein the first set of fuel rewards program criteria is satisfied when the biometric information received via the at least one biometric input device matches the previously registered biometric information, and wherein determining whether the second set of fuel rewards program criteria is satisfied includes determining whether the financial card information associated with the customer received from the ICR identifies a debit card, wherein the second set of fuel rewards program criteria is satisfied when the financial card information identifies a debit card;

awarding the customer the instantaneous PPU discount for a purchase of fuel as a reward in based on whether the first set of fuel rewards criteria and the second set of fuel rewards criteria are satisfied, wherein a first portion of the instantaneous PPU discount is provided by a financial card provider associated with the debit card and second portion of the instantaneous PPU discount is provided by a merchant operating the fuel dispenser when the second set of fuel rewards criteria are satisfied, wherein the second portion of the instantaneous PPU discount corresponds to a reduced fee charged to the merchant by the financial card provider associated with the debit card, and wherein awarding the customer the instantaneous PPU discount includes:

automatically reducing the posted price of fuel at the fuel dispenser to produce a reduced fuel price; and activating the fuel nozzle to dispense fuel at the reduced fuel price.

2. The system of claim 1, wherein said biometric information comprises fingertip scans.

3. The system of claim 1, wherein said biometric information comprises retinal scans.

4. The system of claim 1, wherein the fuel pump controller is configured to offer the customer another PPU discount as a reward for the customer performing other actions.

5. The system of claim 1, further comprising prompting the customer for a personal identification number (PIN) prior to conducting a debit transaction to charge said debit card for said purchase of fuel.

6. The system of claim 1, wherein the instantaneous PPU discount awarded in exchange for providing the biometric information is associated with a first discount amount for each of a first number of times that the customer provides the biometric information, wherein the instantaneous PPU discount awarded in exchange for providing the biometric information is associated with a second discount amount for each of a second number of times that the customer provides the biometric information, wherein the second number of times is greater than the first number of times, and wherein the second discount amount is greater than the first discount amount.

7. The system of claim 4, further comprising recording information associated with said other actions in an earned rewards database, wherein said another PPU discount is awarded based on said information associated with said other actions recorded in said earned rewards database, and wherein said earned rewards database is not utilized to award the instantaneous PPU discount.

* * * * *